(12) United States Patent
Feldkamp et al.

(10) Patent No.: US 12,062,949 B2
(45) Date of Patent: Aug. 13, 2024

(54) DEVICE COMPRISING A HOUSING, AN ELECTRICAL CIRCUIT IN THE HOUSING, AND AN ELECTRICALLY CONDUCTIVE CONNECTION BETWEEN THE HOUSING AND THE CIRCUIT

(71) Applicant: Hella GmbH & Co. KGaA, Lippstadt (DE)

(72) Inventors: Horst Feldkamp, Lippstadt (DE); Georg Goessmann, Moehnesee (DE); Christian Praest, Langenberg (DE); Christoph Schulte, Paderborn (DE); Benjamin Grothe, Wickede (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 50 days.

(21) Appl. No.: 17/547,981

(22) Filed: Dec. 10, 2021

(65) Prior Publication Data
US 2022/0190688 A1 Jun. 16, 2022

(30) Foreign Application Priority Data
Dec. 11, 2020 (DE) ................. 10 2020 133 073.1

(51) Int. Cl.
*H02K 11/01* (2016.01)
(52) U.S. Cl.
CPC ................. *H02K 11/0141* (2020.08)
(58) Field of Classification Search
CPC ........... H02K 11/0141; H02K 2203/03; H02K 3/522; H02K 5/08; H02K 5/225;
(Continued)

(56) References Cited

U.S. PATENT DOCUMENTS

| 4,381,878 A | * | 5/1983 | Lechner | ............... | H01R 12/721 439/64 |
| 5,971,806 A | * | 10/1999 | Evans | ................. | H01R 12/721 439/632 |

(Continued)

FOREIGN PATENT DOCUMENTS

| DE | 2938760 A1 | 4/1981 |
| DE | 19927187 A1 | 12/2000 |

(Continued)

OTHER PUBLICATIONS

English translation of DE-102018001015-A1 (Year: 2019).*

*Primary Examiner* — Tulsidas C Patel
*Assistant Examiner* — Joshua Kiel M Rodriguez
(74) *Attorney, Agent, or Firm* — Muncy, Geissler, Olds & Lowe, P.C.

(57) ABSTRACT

A device with a housing electrically conductive at least in regions, with an electrical circuit in the housing, with an electrically conductive connection between an electrically conductive region of the housing and the circuit, and with a holder made up of an insulator, which is arranged in the housing and to which at least parts and/or components of the electrical circuit are attached. At least one electrically conductive spring element, which is attached in or to the holder and which has a first end protruding beyond the holder and bearing against the housing with a spring force, is provided for establishing the electrically conductive connection between the electrically conductive region of the housing and the circuit.

10 Claims, 3 Drawing Sheets

(58) Field of Classification Search
CPC .... H02K 11/33; H05K 5/0217; H05K 5/0247; H01R 13/02
See application file for complete search history.

(56) References Cited

U.S. PATENT DOCUMENTS

| | | |
|---|---|---|
| 11,075,565 B2 | 7/2021 | Stubner et al. |
| 2020/0212768 A1* | 7/2020 | Guardiola ............... H02K 11/40 |

FOREIGN PATENT DOCUMENTS

| | | | |
|---|---|---|---|
| DE | 102016204954 A1 | 9/2017 | |
| DE | 102018001015 A1 * | 8/2019 | ............. H02K 11/33 |

* cited by examiner

DEVICE COMPRISING A HOUSING, AN ELECTRICAL CIRCUIT IN THE HOUSING, AND AN ELECTRICALLY CONDUCTIVE CONNECTION BETWEEN THE HOUSING AND THE CIRCUIT

This nonprovisional application claims priority under 35 U.S.C. § 119(a) to German Patent Application No. 10 2020 133 073.1, which was filed in Germany on Dec. 11, 2020, and which is herein incorporated by reference.

BACKGROUND OF THE INVENTION

Field of the Invention

The present invention relates to a device with a housing electrically conductive at least in regions, with an electrical circuit in the housing, with an electrically conductive connection between an electrically conductive region of the housing and the circuit, and with a holder made up of an insulator, which is arranged in the housing and to which at least parts and/or components of the electrical circuit are attached.

Description of the Background Art

Devices with a housing and an electrical circuit arranged in the housing are indispensable in everyday life. It is also known that housings of such devices are electrically conductive and are electrically connected to the circuit enclosed by the housing. As a result, electromagnetic radiation emanating from the electrical circuit can be reduced and the electromagnetic compatibility of the device can be improved. It is possible to connect the housing to a protective conductor in order to reduce the risk of an electric shock if a voltage between ground and the housing drops due to a fault.

It is known from the prior art to connect the housing and electrical circuits via cables. To this end, the cables must be connected to the circuit on the one hand and to the housing on the other. This is time-consuming.

SUMMARY OF THE INVENTION

It is therefore an object of the invention to provide a device such that an electrical connection between the housing and the circuit is possible with simple means and, if possible, without additional assembly effort.

This problem is solved according to the invention in that at least one electrically conductive spring element, which is attached in or to the holder and which has a first end protruding beyond the holder and bearing against the housing with a spring force, is provided for establishing the electrically conductive connection between the electrically conductive region of the housing and the circuit.

When a device of the invention is assembled, the holder and the housing are connected such that the initially relaxed spring element is elastically deformed and tensioned and, due to the tension, bears against the housing, so that an electrically conductive connection is made between the housing and the spring element. The spring element attached to or in the holder can then be connected to the circuit in any desired manner. The spring element advantageously has a second end which protrudes beyond the holder and is electrically conductively connected to the circuit. Not only can the circuit, a component, and/or a part of the circuit be connected to the second end in an electrically conductive manner, they can also be attached to the second end.

The second end of the spring element can form a press-fit pin. Such press-fit pins are known, for example, from so-called press-fit connections, with which, for example, circuit boards can be attached and electrically connected at the same time. For this purpose, the circuit boards can have holes into which the press-fit pins are inserted.

Thus, the circuit of a device of the invention can also have a circuit board which is attached to the press-fit pins of the spring elements and is electrically connected to the press-fit pins.

The circuit board can be attached to the housing independently of the press-fit pins. Thus, the circuit board can already be connected to the housing before the holder and housing are put together. During assembly, the connection between the second ends of the spring elements and the circuit board can then be made.

The housing can have multiple parts. The circuit board can then be attached in a first housing part of the housing before assembly. The first housing part may be a housing cover.

The holder of a device of the invention can be a plastic injection-molded part. At least one part or a component of the circuit can be injection molded completely or partially in this plastic injection-molded part.

The device of the invention can have an electric motor. The stator of the motor, in particular a stator core, can be completely or partially embedded in the holder. The stator and in particular stator windings can be part of the electrical circuit provided in the housing.

The spring elements can be electrically insulated from other parts or components of the circuit that are completely or partially enclosed by the plastic of the holder. However, it is also possible for an electrical connection to be made with these parts or components.

The device of the invention can be a pump.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
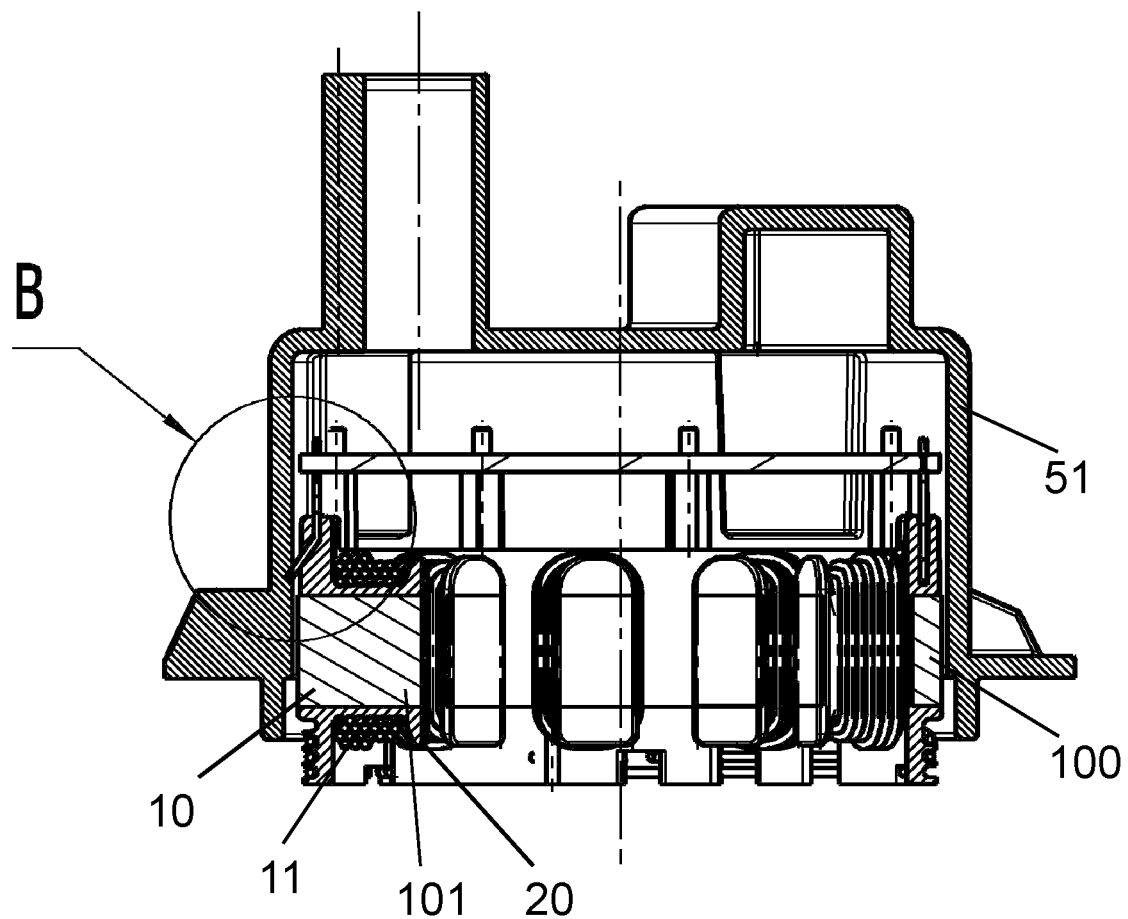
FIG. 1 shows a section through an arrangement made up of a first housing part, a circuit board, a holder, a stator, and a spring element.
Figure 2:
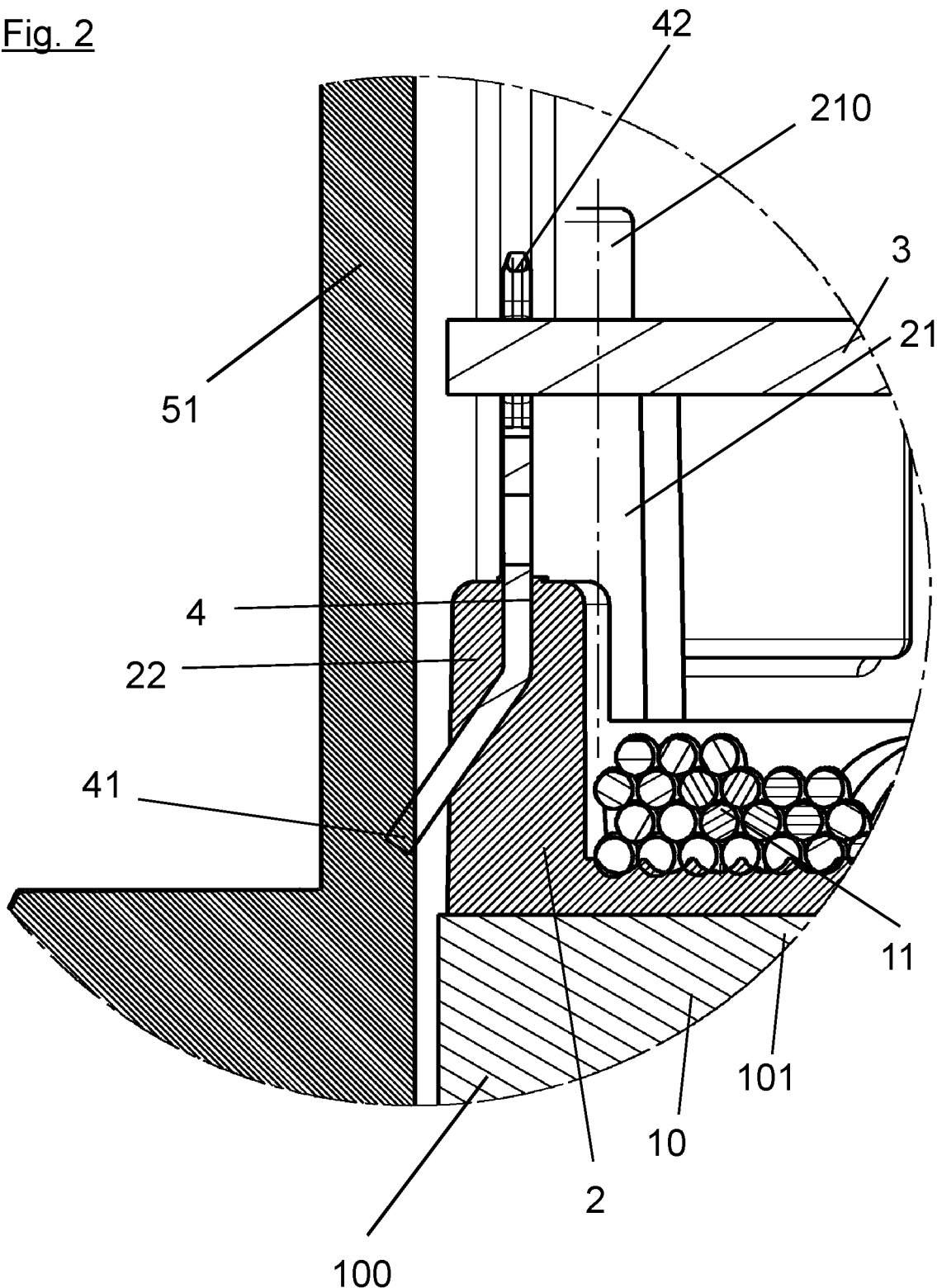
FIG. 2 shows detail B from FIG. 1.
Figure 3:
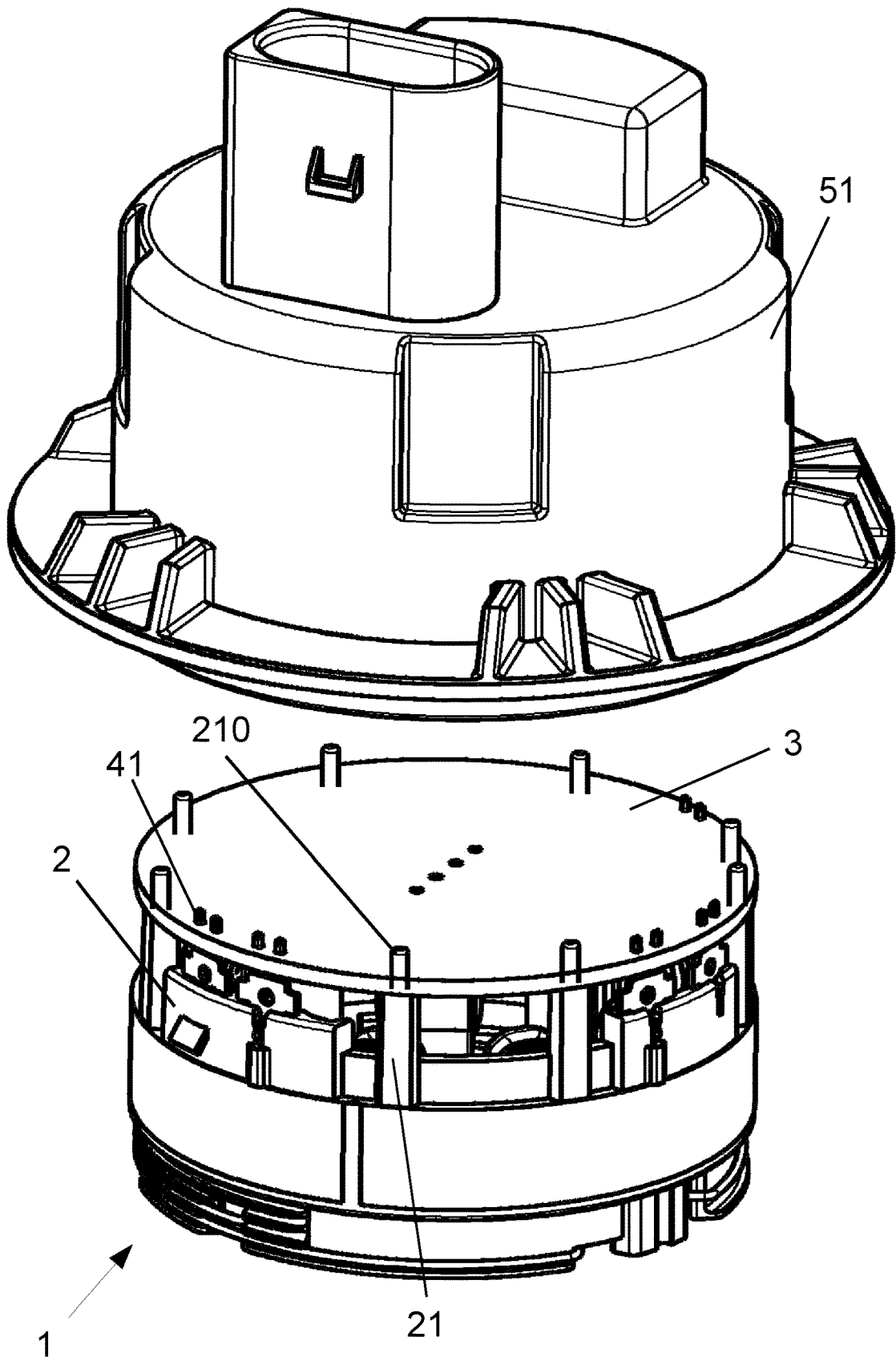
FIG. 3 shows a perspective view of the holder, stator, and spring element of the arrangement from FIG. 1.

The device of the invention, of which parts are shown in FIGS. 1 to 3, comprises a motor, of which stator 1 is shown in the figures. Stator 1 has a core 10. Core 10 is formed by a ring 100 and projections 101 protruding inwardly from said ring 100. Core 10 is partially overmolded with a plastic that forms a holder 2. Both ring 100 and projections 101 are partially overmolded. Holder 2 protrudes at the ends of projections 101 and thus has collars 20 at the ends of projections 101. Stator windings 11 of the motor are arranged on projections 101 between these collars 20 and ring 100.

Holder 2 can have a plurality of first domes 21 which protrude upwards from the overmolding of ring 100. These first domes 21 have a tapered end 210. A shoulder on which circuit board 3 is disposed is formed between tapered end 210 and the remaining part of first dome 21. In addition, tapered ends 210 pass through holes in circuit board 3. This makes it possible to position circuit board 3 on holder 2.

Components which are connected to one another by conductor tracks of circuit board 3 are attached to circuit board 3. These conductor tracks and components form parts of a circuit which also includes stator 1 of the motor.

Holder 2 also can have a plurality of second domes 22. Spring elements 4 made of metal are embedded in this second dome 22. A first end 41 and a second end 42 of these spring elements 4 protrude out of each second dome 22. First ends 41 protrude laterally outward out of second domes 22. These first ends 41 protrude beyond ring 100 of stator core 10 and holder 2. These first ends 41 are elastically deformable. Second ends 42 of spring elements 4 protrude upwards out of second domes 22. These second ends 22 form press-fit pins which are pressed into holes in circuit board 3. Circuit board 3 is attached thereby with the press-fit pins and thus to holder 2.

Only a first housing part 51 of the housing of the device is shown. This first housing part 51 is a hood or at least similar to a hood and has a circumferential outer wall and an end face wall. The outer wall encloses a space which has a diameter that is larger than the outer diameter of holder 2 or ring 100 of stator core 10, but smaller than a circular line defined by first ends 41 of spring elements 4 when these protrude outwards undeformed and not tensioned. First housing part 51 is made of an electrically conductive plastic.

This first housing part 51 is slipped over the arrangement made up of holder 2, stator 1, spring elements 4, and circuit board 3. As a result, first ends 41 of spring elements 4 are pressed inward. As a result, first ends 41 of spring elements 4 bear against the inside of first housing part 51. As a result, first ends 41 bear fixedly against first housing part 51 and a conductive connection is established between first housing part 51 and circuit board 3 via spring elements 4. Preferably, a conductor track of the circuit board is contacted by spring elements 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device comprising:
   a housing electrically conductive at least in regions;
   an electrical circuit arranged in the housing;
   an electrically conductive connection between an electrically conductive region of the housing and the electrical circuit;
   a holder made up of an insulator, which is arranged in the housing and to which at least parts and/or components of the electrical circuit are attached; and
   at least one electrically conductive spring element attached in or to the holder, the electrically conductive spring element having a first end protruding beyond the holder and bearing against the housing with a spring force, such that the electrically conductive spring element establishes the electrically conductive connection between the electrically conductive region of the housing and the electrical circuit,
   wherein a distal end of the first end of the electrically conductive spring element projects in a direction towards an inner wall of the housing and bears against the inner wall of the housing.

2. The device according to claim 1, wherein the electrically conductive spring element has a second end which protrudes beyond the holder and is electrically conductively connected to the electrical circuit.

3. The device according to claim 2, wherein the electrical circuit, a part of the electrical circuit, and/or a component of the electrical circuit are attached to the second end of the electrically conductive spring element.

4. The device according to claim 3, wherein the second end of the electrically conductive spring element forms a press-fit pin.

5. The device according to claim 4, wherein the electrical circuit has a circuit board which has a hole with which the circuit board is plugged onto the press-fit pin formed by the second end.

6. The device according to claim 5, wherein the housing has multiple parts and wherein the circuit board is attached to a first part of the housing.

7. The device according to claim 1, wherein the holder is a plastic injection-molded part and a part or a component of the electrical circuit is completely or partially overmolded by the plastic of the holder.

8. The device according to claim 7, wherein the electrically conductive spring element is electrically insulated from the part or the component of the electrical circuit that is overmolded by the plastic of the holder.

9. The device according to claim 1, wherein the device comprises an electric motor, and wherein a stator of the electric motor is a component of the electrical circuit.

10. The device according to claim 9, wherein the holder is a plastic injection-molded part and wherein the stator is completely or partially overmolded by the plastic of the holder.

* * * * *